Patented Mar. 10, 1931

1,795,756

UNITED STATES PATENT OFFICE

LINN BRADLEY, OF MONTCLAIR, NEW JERSEY, AND EDWARD P. McKEEFE, OF PLATTSBURG, NEW YORK, ASSIGNORS TO BRADLEY-McKEEFE CORPORATION, OF NEW YORK, N. Y., A CORPORATION OF NEW YORK

PRODUCTION OF CHEMICAL PULP

No Drawing. Application filed September 2, 1926. Serial No. 133,293.

This invention relates to the production of chemical pulp, and to the treatment of residual liquors for the regeneration of cooking liquors.

More particularly the invention relates to cyclic and interrelated operations in which two different kinds or types of sulfur-containing cooking liquors are employed, of which soda is the base, some of the same sulfur being present in one type of cooking liquor, in one instance, as a sulfite, and being present, in another instance, in another type of cooking liquor, as a sulfid, and with successive employment of some of the same soda as a sulfite of sodium in one type of cooking liquor and as sodium sulfid in another type of cooking liquor, although the soda and the sulfur may in part be present as other sodium compounds.

Among the particular improvements which the invention presents are interrelated operations or steps employing an acid sulfite of sodium cooking liquor and a cooking liquor containing sodium sulfid as a primary active reagent, in which cooking liquor for one type of cooking process is regenerated (at least in part) from constituents of residual liquor from another type of cooking operation. The acid sulfite cooking liquors, to which the invention particularly relates, are cooking liquors which contain sodium bisulfite and sulfurous acid, i. e. those which contain a relatively high content of uncombined sulfite, together with a regulated amount of combined sulfite (as $NaHSO_3$), either as charged into the digester or as produced therein subsequent to the introduction of the liquor. The sulfid type of cooking liquors, to which the invention particularly relates, are those in which sodium hydroxide is either present in lesser amount than the sodium sulfid or is absent therefrom. These soduim sulfid-containing cooking liquors are produced, at least in part, from sodium compounds obtained as a result of a treatment in which constituents of the residual liquor from the acid type of cooking operation are subjected to a heating treatment in a furnace operating under reducing conditions.

According to one embodiment of the invention, wood chips are cooked with an acid sulfite type of cooking liquor which contains the required amount of a sulfite of sodium and the required amount of uncombined sulfite, such cooking liquor being free from objectionable amounts of sodium thiosulfate, the resulting residual liquor is separated from the pulp, another lot of wood chips is cooked with a cooking liquor containing sodium sulfid and a lesser amount of sodium hydroxide, a sufficient amount of the two reagents being employed to effect the desired degree of digesting to produce a chemical pulp of good quality, the resulting residual liquor is separated from the pulp, and the two residual liquors are treated for the decomposition of organic compounds and the regeneration of suitable cooking liquor for employment in the cycle of the invention.

For example, residual liquor from the alkaline cook may be admixed with residual liquor from the acid cook in regulated amount so that the admixture is either mildly acid, neutral or moderately alkaline to litmus. Organic matter may separate out from solution as a result of such treatment, especially when the alkaline residual liquor contains only a moderate amount of sodium carbonate. Where such alkaline residual liquor contains a large amount of sodium carbonate, which may be the case when the alkaline cooking liquor contained primarily sodium sulfid and sodium carbonate with little if any sodium hydroxide, the admixed residual liquor may contain a different amount of suspended organic matter. It is advantageous to separate the liquor from most of the suspended organic matter, and this may be readily done, for example while the liquor is either mildly acid or neutral to litmus. The separated liquor is then advantageously made alkaline by adding a moderate amount of strong alkaline sodium compound, e. g. NaOH, or a solution of sodium carbonate and sodium sulfid, thereby redissolving suspended organic compounds still remaining in the separated liquor. The separated organic material may be advantageously added to concentrated residual liquor produced from the treated mixture of residual liquors. The treated mixture of residual liquors may be concentrated in any suitable manner. For example, it may be subjected to a concentrating step in a multiple-effect evaporator, and the steam for such step may be obtained from that relieved from the acid type of digester during or near the end of the cooking operation, preferably removing $SO_2$ which may be contained therein, by absorbing it in an alkaline compound contained in water, and allowing the steam to be used thereafter.

Some alkaline residual liquor may remain, i. e., such portion thereof as is not employed for admixing with acid residual liquor. Such remaining alkaline residual liquor may be separately concentrated, either without or subsequent to having been utilized to effect a preliminary treatment of wood chips whereby any remaining sodium sulfid therein is caused to react with readily removable constituents of wood, and the surplus, which may be readily drained off from such treated chips, being thereafter concentrated. Such concentrated liquor may be fed into a suitable furnace and organic compounds decomposed and the soda obtained mainly in the form of sodium carbonate. By employing a regulated excess of air over that required to burn the combustible constituents from the residual liquor, the soda product may contain little if any sodium sulfid or sodium thiosulfate, although it may contain some sodium sulfate. Such furnacing operation is advantageously so regulated that most of the sulfur content of this portion of the alkaline residual liquor is either driven off from its association with soda or is present along with the soda as an oxidized compound such as sodium sulfite or sodium sulfate or both. The soda is dissolved in water and is later sulfited to form cooking liquor for the acid sulfite cooking operation of the cycle. In order to further prepare the liquor for the sulfiting step, where this is required, it may be subjected to an aeration treatment, or to another oxidizing treatment, for example with a regulated amount of sodium manganate, or of sodium peroxide, or of sodium hypochlorite, to oxidize objectionable constituents therein, if any, such as sodium sulfid and sodium thiosulfate. The liquor is clarified, and to assist in such clarification a moderate amount of lime or lime mud free from objectionable material may be admixed therewith and the clarified and purified liquor separated from the undissolved material. The sulfiting of the clarified and purified liquor may be carried out in any suitable manner to produce cooking liquor for the acid type of digestion referred to. Such cooking liquor, as stated, contains sodium bisulfite and sulfurous acid and is preferably free from an objectionable amount of sodium thiosulfate. The purification treatment is for the purpose of facilitating the production of cooking liquor of this kind.

The treated and concentrated mixed residual liquor, prepared as outlined above, is subjected to treatment in a suitable furnace whereby organic matter is decomposed and constituents are subjected to a reducing furnace treatment which yields a product containing a considerable amount of its content of sodium and sulfur in the form of sodium sulfid together with a considerable amount of sodium carbonate as a result, a considerable amount of sulfur generally being carried off, along with the gases leaving the furnace, in one form or another. Some of this sulfur content may be regained and for this purpose the gases are subjected to a regulated oxidizing treatment so as to convert contained combustible sulfur compounds into $SO_2$ or $SO_3$ or both, advantageously with the $SO_2$ in preponderating amount so that it may be absorbed in a solution of sodium carbonate, preferably after removing solids from the gases when these solids are high in sodium sulfate. Such sodium sulfate may be added to the material which is to undergo the reducing furnace treatment which produces the sodium sulfid employed in the alkaline cook of the cycle. The soda product which contains the sodium carbonate and the relatively high sodium sulfid content is clarified and, for example, after a mild causticizing treatment which produces a cooking liquor containing more sodium sulfid than sodium hydroxide, the resulting cooking liquor is employed for cooking wood to produce pulp. Untreated chips may be cooked therewith, or the chips which have been partially treated by alkaline residual liquor may be further treated with the cooking liquor so as to produce the pulp.

When sodium sulfate is supplied for replenishing soda losses, it is preferably added to the material which is to undergo the furnacing treatment whereby the high sodium sulfid-containing soda product is produced, thus augmenting the supply of sodium sulfid. When sodium carbonate is employed for replenishing soda losses it is preferably added to the sodium carbonate-containing liquor which is to be sulfited for the production of the acid cooking liquor. Sodium hydroxide, when added for such purpose, as well as sodium sulfid, should be added to the alkaline cooking liquor.

A small or a moderate amount of sodium sulfite may be added to the alkaline cooking liquor to supplement or modify the action of the sodium sulfid therein, or such sodium sulfite may be produced therein in any suitable manner, e. g. by treating the sodium carbonate-sodium sulfid solution with a regulated amount of calcium sulfite ($CaSO_3$), and separating the liquor from the resulting calcium carbonate.

Various amounts of pulp may be produced by the respective types of cooking liquors. The pulp produced by the alkaline type of process may be the result of either a single stage or a multiple stage digesting treatment, for instance as hereinbefore disclosed. The multiple-stage treatment facilitates the production of a product suitable for utilization by sulfiting to form the acid cooking liquor, and it permits the pulping operation to be conducted with a somewhat reduced amount of active reagents than where such operation is conducted in a single stage, as usually done in ordinary pulp-producing operations. However, the operations of the cycle are preferably so regulated that the alkaline digestion steps of the cycle produce residual liquor in adequate amount and of suitable composition so that the desired amount and quality of pulp from the acid sulfite type of cooking may be obtained readily by cooking wood with acid sulfite cooking liquor regenerated from soda recovered from such alkaline residual liquor. In case there is an objectionable amount of sodium sulfid in the soda product which is to serve as a basis for the acid cooking liquor, a larger amount of pulp, relatively, may be produced by the alkaline cooking liquors thus causing more sodium sulfid to react with organic constituents of wood and thus to increase the sodium carbonate as compared to sodium sulfid in recovered soda compounds from the furnacing treatment.

The following examples will serve to illustrate the cooking liquors of the alkaline type, each showing the amount of the respective chemicals, in pounds, based upon 4,000 pounds of poplar wood. For woods requiring more chemical than poplar, these amounts may be varied accordingly.

| $Na_2S$ | $Na_2CO_3$ | $Na_2SO_3$ | $NaOH$ |
|---|---|---|---|
| 400 | 300 |  | 350 |
| 800 | 1087 |  |  |
| 800 | 1087 | 322 |  |
| 600 | 815 | 205 | 205 |
| 600 | 815 |  | 300 |
| 600 | 300 | 322 | 200 |
| 640 | 544 | 258 | 164 |
| 711 | 966 | 144 | 92 |

Cooking liquors of this type may also have a moderate amount of sodium sulfate, sodium thiosulfate, etc. present, but such reagents are preferably kept low in amount, since one of the objects of the invention is to utilize the step of cooking wood with sodium sulfid and subsequently produce from constituents of the resulting residual liquor, a soda product which can readily serve as the base for the acid cooking liquor which contains a fairly high content of uncombined $SO_2$ and should therefore be free from an objectionable amount of sodium thiosulfate.

Wood may be cooked with cooking liquors of the kind shown above, these cooking liquors generally and advantageously containing a moderate amount of sodium hydroxide, in either a single-stage or a multiple-stage treatment. Where a single stage treatment is employed, the wood may be cooked for the required length of time, for example three to eight hours or so, at a temperature of around 170 to 180 deg. centigrade, with suitable circulation of the cooking liquor in the digester. Instead of employing the cooking liquor in only one stage, residual liquor from the alkaline cooking by such liquor may be employed to digest wood chips freshly charged so as to dissolve a considerable amount of the more readily reactive constituents thereof. Upon the completion of such preliminary treatment, which may be carried out at any suitable temperature and for a sufficient period of time, such liquor as may be readily removed therefrom is withdrawn from the digester, permitting such portion of the liquor as is retained by the treated chips to remain with the treated chips within the digester. Thereafter, a sufficient amount of freshly supplied cooking liquor is employed to complete the cooking of the treated chips to the point where good chemical pulp may be obtained therefrom. When a large part of the readily reactive constituents of the wood are thus previously removed, the amount of active reagent, i. e., $Na_2S$, or $Na_2S$ and $NaOH$, with or without some $Na_2SO_3$, may be considerably less than where such chips have not had such material removed from them. The residual liquor from the second or final stage cooking treatment will generally contain a considerable amount of soda compounds therein which will react with fresh chips to form sodium organic compounds in the first stage digestion treatment. If such second-stage residual liquor contains any $NaOH$ or $Na_2S$, these will be quickly converted into other compounds by such first-stage treatment, and certain of the sodium-organic compounds resulting from the second-stage cooking treatment and contained in the residual liquor which is employed for the first-stage digesting treatment, also are capable of reacting with organic compounds contained in the fresh chips, and such a reaction generally results in the formation of other compounds with the precipitation of some organic compound or compounds therefrom. Thus the residual liquor from the first-stage digesting treatment may contain suspended organic material, but it is generally in such a finely divided state that it may be readily removed from the treated chips along with the residual liquor. Some of such separated organic matter may remain with the chips, but a considerable amount may be thus removed. Such constituents as are removed from the chips and which are present in the resulting residual liquor from the first-stage digesting treatment reduce the amount of non-cellulose which is required to be removed in the second-stage cooking. The residual liquor which is employed for the first-stage digesting treatment may be fortified to a moderate extent by adding thereto some sodium sulfid, or some sodium sulfid together with sodium hydroxide. Sodium carbonate will generally be present in the material added for such a fortification. When about a half of the non-cellulose of the fresh wood is removed in the first-stage digesting, for example by using residual liquor in adequate amount and having enough suitably reactive sodium compounds for effecting such removal, the amount of active chemical present in the fresh cooking liquor supplied for the second-stage cooking treatment of the previously treated chips, may be around two-thirds of that required when single-stage cooking is employed for the same amount and kind of wood. The residual liquor from such second-stage cooking will contain a considerable amount of sodium compounds which are active in the first-stage digesting treatment, and may even be sufficient to remove about half of the non-cellulose therefrom, and require no additions for fortifying it. Moreover, such two-stage treatment usually results in a pulp of improved quality, especially when the amount of sodium sulfid employed far exceeds that of the sodium hydroxide, e. g. cooking liquor containing only sodium sulfid and sodium carbonate and being free from any large amount of sodium hydroxide. In particular, pulps of better bleaching quality may be thus obtained as compared to the utilization of sodium sulfid-sodium carbonate cooking liquors in a single-stage cooking operation. It appears that the preliminary treatment of the chips with such residual liquor so as to remove most of the readily reactive constituents of the freshly supplied wood chips, makes more feasible the production of good pulp by the second-stage cooking operation, even when no sodium hydroxide is present in the cooking liquor or in the residual liquors. The residual liquor which may be thus obtained from the partial treatment of freshly supplied chips, carrying a relatively high content of organic matter as compared with the soda therein, and being substantially free from sodium sulfid, may be concentrated and constituents in the liquor subjected to a heat treatment whereby the soda recovered is principally in the form of sodium carbonate, a considerable amount of the sulfur content of such liquor being driven off from its association with soda during such furnace treatment, and a considerable amount of the sulfur thus driven off appears to be present in the gases in the form of $SO_2$, after the combustible gases have been burned by adding air thereto. By employing sodium sulfid for removing non-cellulose constituents from the wood, for the greater part at least, the amount of sodium carbonate which may be obtained by the subsequent furnace treatment, per ton of pulp produced by the alkaline cooking treatment or treatments, of the cycle, may be relatively greater than where the same amount of soda is obtained by a furnace treatment of a similar kind following the pulping of wood by cooking liquors which contain more sodium hydroxide than sodium sulfid. And the pulps will differ in quality and in most cases the quantity of pulp per unit of wood will be greater when only a small amount of NaOH is utilized.

It will thus be seen that when it is desired to produce a relatively large amount of pulp by cooking wood with a highly acid bisulfite of sodium cooking liquor, containing no objectionable amount of sodium thiosulfate, and it is desired to regenerate such cooking liquor from residual liquor from such an acid cooking operation, the cycle of the present invention has certain distinct advantages and that the production of sodium sulfid and its subsequent utilization to remove non-cellulose constituents from wood, is taken advantage of as a part of the regeneration steps. Thus by producing a moderate amount of pulp by the alkaline process, and treating residual liquor therefrom, the cooking liquor for the acid sulfite operation is facilitated.

In producing the clarified cooking liquor which is to be employed in the alkaline cooking step or steps, a moderate and regulated amount of lime may be added to the solution which contains the sodium sulfid and sodium carbonate, thus causticizing a moderate amount of the sodium carbonate. The lime mud aids in the clarification.

Sulfur dioxide and steam may be relieved from digester into another, for example from one digester, which is nearly ready to be "blown", into another digester which is being heated up or is being cooked, thus increasing the amount of uncombined $SO_2$ in the latter digester. This may permit the cooking operation to be conducted at a somewhat lower temperature or hasten the cooking operation at the same temperature, as compared with cooking liquors having a lower content of uncombined $SO_2$, and this may cause a reduced amount of $SO_2$ to be combined with organic material with a resulting reduction in the amount of sulfur required.

Some $SO_2$ and steam may be relieved from one digester into a suitable accumulator, and the latter may have a solution of sodium carbonate or of sodium sulfite therein. By introducing the mixture of steam and $SO_2$ at the lower end of the accumulator, the $SO_2$ may be absorbed therein and the steam may be allowed to escape therefrom and may be later employed for heating liquor in a multiple-effect evaporator, or for heating up cooking liquor freshly charged into a digester of the acid type. Escaping $CO_2$ may be permitted to escape in any suitable manner. Sodium hydroxide may be employed in solution within the accumulator to absorb $SO_2$, thus avoiding the $CO_2$ in the relieved steam from the accumulator. $Ca(OH)_2$ may be employed in suspension in water contained within the accumulator, in case any sulfite of calcium is to be obtained. Such sodium sulfite or acid sulfite of sodium as is formed in the accumulator may be employed in the acid sulfite cooking operation. The liquor may be sulfited to the required degree in any suitable manner, for example by first removing the liquor from the accumulator and then further sulfiting it under suitable conditions. Where some sodium bisulfite is formed in the accumulator, it may be removed and then charged into a digester containing freshly charged chips, and it may be transferred under pressure if desired. A further amount of $SO_2$, if desired, may be absorbed in such liquor within the digester, for example by relieving $SO_2$ from another digester.

Some of the $SO_2$ required in the acid cooking liquor may be obtained as a sulfite of sodium by scrubbing the furnace gases which contain it in suitable amount, with a solution which contains mainly sodium carbonate and is free from sodium sulfid and sodium thiosulfate. Preferably the furnace gases are treated to remove solids therefrom prior to the srubbing operation. Such gases may be subjected to an electrical precipitation treatment above the dewpoint.

An advantageous application of the operations described herein, comprises cooking highly resinous pine chips with the alkaline cooking liquor (usually containing a moderate amount of sodium hydroxide and a greater amount of sodium sulfid), cooking gum wood chips with the acid cooking liquor, adding some of the acid residual liquor to some of the alkaline residual liquor to remove a portion of the precipitable or separable organic material therefrom, removing the liquor from such separated organic material, and later adding a further regulated amount of acid residual liquor to the previously partially treated alkaline residual liquor so as to produce a mixed residual liquor which is suited for the subsequent steps of the cycle. By adding acid residual liquor to alkaline residual liquor in regulated steps or stages, with removal of separated organic material between the successive additions, organic material of somewhat different composition may be obtained.

When there is no alkaline residual liquor remaining over and above that utilized for admixing with acid residual liquor, the concentrated mixture of residual liquor may be divided into two suitable portions, one portion being subjected to a reducing furnace treatment to produce the sodium carbonate and relatively high sodium sulfid product, and the other portion being subjected to a furnacing treatment whereby a large portion of the sulfur content thereof is driven off from its association with soda or is present in the resulting soda product as a suitably oxidized compound, such as sodium sulfite or sodium sulfate. Sodium sulfid is advantageously absent therefrom, but in case it is present in too large an amount for the subsequent sulfiting step, the liquor may be treated to remove the sulfid sulfur or to convert it into another compound of suitable kind.

Instead of treating the acid residual liquor with alkaline residual liquor, in the manner described above, some of the sodium carbonate-sodium sulfid liquor may be employed for such treatment, for example some of the sodium carbonate-sodium sulfid liquor which is to be subjected to a causticizing or clarification treatment. However, the employment of alkaline residual liquor for this operation is preferred and it results in a soda product containing a somewhat different ratio of sodium carbonate to sodium sulfid. When the solution of the soda compounds obtained as a result of the furnace treatment is employed in such operation, some of the soda undergoes two furnacing treatments prior to it being employed in a cooking liquor with the probability that more sulfur will be eliminated from the product and a relatively increased content of sodium carbonate in the furnace product will be the result. Such an operation may be of advantage where such a furnace product is desired, for example where a preponderance of sodium hydroxide is desired in the causticized liquor, or where a liquor high in sodium carbonate is desired.

In producing the soda product which is to be sulfited to produce cooking liquor of the acid type, the untreated portion of the residual liquor, if any, or a portion of the treated residual liquor, after the admixture of an alkaline compound with acid residual liquor, may be treated by subjecting the concentrated liquor to a spraying or an atomizing step thereby introducing the liquor in finely divided condition into a hot furnace and therein decomposing the organic compounds and burning combustibles, for example by employing an excess of air so as to form a soda product which contains a large amount of sodium carbonate and which is free or substantially free from sodium sulfid and other objectionable sulfur or sulfur compound. Sodium sulfate may be present in such soda product and be present in the residual liquor of the acid type subsequently produced by a cooking operation of the acid sulfite type, and such sodium sulfate is available for the subsequent production of some sodium sulfid. Some of the products of combustion may be recirculated, for example by admixing with some of the concentrated liquor to atomize it, or/and with some of the air supplied to the furnace, or/and by introducing a regulated amount of such recirculated gases adjacent the walls and roof of such furnace, to assist in maintaining satisfactory operating conditions therein, for instance by preventing the otherwise extremely high temperatures at such places. The furnace gases, preferably after utilizing them for the production of steam by passing them through a boiler for such purpose, may be subjected to any suitable treatment to recover the suspended soda compounds, for example by subjecting the somewhat cooled gases to an electrical field of high intensity produced by substantially unchanging polarity of two types of electrodes, such as commonly employed in the well-known art of electrical precipitation of solids and liquids from gases carrying such material in suspension therein. The soda product thus obtained may serve to provide the solution which is to be sulfited, as described above. The gases from the reducing furnacing operation, employing any suitable type of furnace which will produce the required results, may be admixed with the gases from the furnace of the other step, and additional air may be added if required, so that the combustible materials from the reducing furnace treatment may be burned to generate additional heat and these admixed products of combustion be employed for generating steam.

When the sodium carbonate liquor which is to be employed in a later step, by sulfiting, contains a moderate amount of sodium sulfid, such liquor may be treated with a regulated amount of iron sulfate to precipitate the sulfid as an iron sulfid, forming a corresponding amount of sodium sulfate in the liquor. Such sulfid of iron may be removed in any suitable manner, and the separated liquor may thereafter be treated with a small amount of lime sufficient to remove any remaining iron and to further clarify the liquor. Such liquor may also be given an oxidation treatment, if required, to remove or alter any remaining oxidizable constituents which might be objectionable such as sodium sulfid or sodium thiosulfate, although the treatment with the iron sulfate will remove substantially all of the sulfid radicle therefrom as an iron sulfid. The iron sulfid material may be utilized in any suitable manner. For example it may be treated with a regulated amount of sulfuric acid to form more iron sulfate for reuse in the above treatment, and drive off H2S which may be burned to form more $SO_2$ for use in the sulfiting step. Another way of treating the iron sulfid material is to intimately admix it with iron pyrites and the mixture later subjected to a roasting operation to form $SO_2$ therefrom and leave an oxide of iron-containing material. Such iron sulfide or pyrite may advantageously have some elementary sulfur admixed therewith to fortify the material and thus facilitate the production of a strong $SO_2$-containing gas which is later employed in the sulfiting step. The gases from such roasting operation may be treated to remove objectionable impurities therein, prior to employing the contained $SO_2$ for such sulfiting operation. The solids may be removed by an electrical precipitation treatment and the gases may be subjected to a suitable scrubbing, for instance by a scrubbing liquor which contains sodium bisulfite which can react with sulfur, or with hydrogen sulfide gas if any is contained in the unpurified gases, or with any iron sulfide which may be mechanically carried over by the gases. The hot solution of sodium bisulfite will permit $SO_2$ to pass on, and this $SO_2$ gas may thereafter be employed in the sulfiting step. The sodium bisulfite liquor used in such scrubbing operation may be removed from time to time as impurities accumulate therein and such material may be employed for reacting with the sodium carbonate and sodium sulfid solution, prior to the causticizing treatment if any, or with the liquor which contains some sodium hydroxide obtained by such a regulated causticizing treatment. Thus the alkaline cooking liquor may contain some sodium sulfite and even some sodium thiosulfate, thus modifying the action of the sodium sulfid-containing cooking liquor. The elementary sulfur which is thus added to the iron pyrite which is to be roasted to supply $SO_2$ for the cycle, may be a sulfur of high purity, or it may be a sulfur of rather low purity, and this permits the employment of such sulfur material which may be a by-product of another operation and accordingly can be obtained at less cost than if sulfur of high purity were to be obtained.

We claim:

1. The cyclic process of producing chemical pulp, which comprises cooking one lot of wood chips in a cooking liquor which contains sodium bisulfite and sulfurous acid and is free from an objectionable amount of sodium thiosulfate, separating the resulting residual liquor from the pulp, cooking another lot of wood chips in cooking liquor which contains more sodium sulfid than sodium hydroxide when freshly charged into the digester, separating the resulting residual liquor from the pulp, subjecting constituents of the residual liquor from the acid cooking operation to a reducing treatment whereby sodium carbonate and sodium sulfid are formed, employing the sodium sulfid so formed in cooking wood with a cooking liquor which contains more sodium sulfid than sodium hydroxide, and treating constituents of the residual liquor from the alkaline cooking operation to produce a cooking liquor which contains sodium bisulfite and sulfurous acid and is free from an objectionable amount of sodium thiosulfate, such treatment including the sulfiting of a solution which contains sodium carbonate and is free from an objectionable amount of sodium sulfid.

2. The further improvement in claim 1, whereby substantially all of the sodium sulfid in the alkaline cooking liquor is caused to react with constituents of the wood.

3. The further improvement in claim 1, which comprises admixing some of the alkaline residual liquor with acid residual liquor and subjecting the admixture to treatment which includes subjecting constituents thereof to a reducing furnace treatment.

4. The further improvement in claim 1, which comprises admixing some of the alkaline residual liquor with an acid residual liquor in amounts regulated to form a mixed residual liquor which is mildly acid to litmus, separating suspended organic matter from the mixture, rendering the separated liquor alkaline to litmus by the addition thereto of a reactive sodium compound which redissolves remaining suspended organic matter, subsequently subjecting the treated residual liquor mixture to a concentrating step and finally subjecting the admixture to a treatment which includes subjecting constituents thereof to a reducing furnace treatment.

5. In a process for producing a chemical pulp-making cooking liquor which contains sodium bisulfite, the step which comprises treating wood with a sodium sulfid-containing cooking liquor whereby substantially all of the sodium sulfid is caused to react with organic constituents derived from wood, and the further steps which include decomposing organic compounds in the resulting residual liquor and sulfiting of the sodium carbonate contained in the soda recovered therefrom.

6. The further improvement in claim 1, whereby the amount of uncombined $SO_2$ in the cooking liquor which is contained in the digester is increased by the introduction of sulfur dioxide.

7. In claim 1, the further improvement whereby the amount of uncombined $SO_2$ in the cooking liquor contained in one digester is increased by relieving $SO_2$ and steam from another digester thereto.

8. In the production of alkaline cooking liquor for the cycle defined in claim 1, the step which includes subjecting the sodium carbonate-sodium sulfid liquor to a causticizing treatment with an insufficient amount of lime to form more sodium hydroxide than sodium sulfid therein.

9. In a cyclic process for producing chemical pulp, the improvement which comprises cooking one lot of wood with a cooking liquor containing sodium bisulfite and sulfurous acid and which is free from an objectionable amount of sodium thiosulfate, cooking another lot of wood with a cooking liquor which contains more sodium sulfid than sodium hydroxide, and regenerating liquor for each cooking process from constituents contained in residual liquor from the other cooking process.

10. In claim 9, the further improvement which includes the regulation of the steps of the cycle so that more pulp is produced by the acid cooking liquor than by the alkaline cooking liquor.

11. In the production of pulp from wood, the process which comprises removing a portion of the non-cellulose organic material of the wood by subjecting the wood to the action of an alkaline liquor, separating the resulting liquor, and thereafter subjecting the treated woody material to a cooking operation employing a cooking liquor which contains substantial amounts of sodium sulfide and sodium sulfite, the proportion of sodium sulfite to sodium sulfide being materially higher than that in liquors customarily employed in the sulfate process.

12. The process of producing pulp from wood which comprises cooking wood in a cooking liquor which contains sodium hydroxide and sodium sulfide, separating a residual liquor from the resulting pulp, utilizing a portion of the residual liquor after having been fortified by adding alkaline sodium compounds for partially cooking further amounts of wood, separating residual liquor from the partially cooked wood and adding suitable white liquor to the partially cooked wood and adhering residual liquor, and continuing the cook in the resulting mixture of white liquor and residual liquor.

13. A process for producing an acid sulfite cooking liquor free from an objectionable amount of thiosulfate which comprises treating furnace gases containing sulfur dioxide to remove entrained non-gaseous material therefrom, scrubbing the resulting gases with a solution of bisulfite so as to remove therefrom constituents which are capable of producing a thiosulfate and absorbing sulfur dioxide from the treated gases in a suitable base to produce a cooking liquor having the desired content of sulfurous acid.

14. The cyclic process of producing chemical pulp as defined in claim 1, which comprises subjecting furnace gases resulting from the decomposition of residual liquors to a treatment including scrubbing with a solution of sodium bisulfite, utilizing the sulfur dioxide in the scrubbed furnace gases to produce an acid sodium sulfite cooking liquor for use in the first named digesting treatment and utilizing exhausted scrubbing liquor for producing sodium sulfite and thiosulfate in the alkaline cooking liquor for use in the second named digesting treatment.

15. In a process for producing chemical pulp from wood the steps which include dissolving non-cellulosic material contained in the wood by subjecting it to a digesting treatment with alkaline residual liquor from the final stage of pulping containing reactive sodium-organic compounds capable of reacting with constituents of the wood and thereby effecting part of the dissolving in the first stage treatment by such sodium-organic compounds and thereby forming residual liquor containing organic matter in suspension derived from such sodium-organic compounds, removing such residual liquor from the partially treated wood chips and subjecting the treated chips to a further cooking operation in a cooking liquor which contains sodium sulfide, thereby producing a residual liquor containing sodium-organic compounds suitable for use in the first digesting step of the process.

16. The process for producing pulp from wood which comprises the following steps: (a) subjecting partially-digested wood chips to a digesting treatment by means of cooking liquor supplied with an alkaline sodium compound, thereby producing an alkaline residual liquor that contains dissolved organic matter; (b) removing such alkaline residual liquor from the fibre-bearing material; (c) adding to such alkaline residual liquor an alkaline sodium compound, thereby fortifying the liquor; (d) treating wood chips by means of the fortified alkaline residual liquor so as to dissolve a substantial portion but less than all of the non-cellulosic organic constituents thereof, thereby forming an alkaline residual liquor containing organic matter thereby dissolved; (e) removing most but not all of such alkaline residual liquor from the treated wood chips; and (f) subsequently supplying to the treated wood chips an alkaline cooking liquor containing an alkaline sodium compound and subjecting the chips to a digesting treatment therewith.

17. The process according to the preceding claim in which the amount of active chemical reagent supplied to the wood chips in step (d) is sufficient to dissolve at least about one-half of the non-cellulosic organic constituents of the wood chips and in which step (d) is regulated to obtain such results.

18. The process according to claim 16 in which the step (a) is carried out by means of cooking liquor supplied with an amount of alkaline sodium compounds sufficient to convert the partially digested wood chips into chemical pulp and leave a residual liquor containing a substantial amount of unconsumed alkaline sodium compounds.

19. The process of producing pulp from wood, which comprises the following steps: (a) subjecting partially-digested wood chips to a digesting treatment by means of an alkaline cooking liquor supplied with alkaline sodium compounds in amount more than sufficient to convert the chips into chemical pulp, thereby producing chemical pulp and an alkaline residual liquor which contains unconsumed alkaline sodium compounds in amount capable of dissolving at least about one half of the non-cellulosic organic constituents of wood chips; (b) removing such alkaline residual liquor from the pulp; (c) supplying such alkaline residual liquor to wood chips and subjecting them to a digesting treatment therewith so as to dissolve at least about one half of the non-cellulosic organic constituents thereof; (d) removing most but not all of resulting residual liquor from the treated chips; (e) subsequently supplying an alkaline cooking liquor to the treated chips and digesting them therewith so as to produce chemical pulp.

20. The further improvement in the preceding claim in which the preliminary treatment of wood chips in step (c) is carried out by the employment of residual liquor resulting from cooking wood with a liquor which contains sodium hydroxide and sodium sulfide.

In testimony whereof we affix our signatures.

LINN BRADLEY.
EDWARD P. McKEEFE.